May 23, 1944.  G. H. MEINZER  2,349,450
APPARATUS FOR DYNAMIC BALANCING
Filed Aug. 2, 1941  3 Sheets-Sheet 1
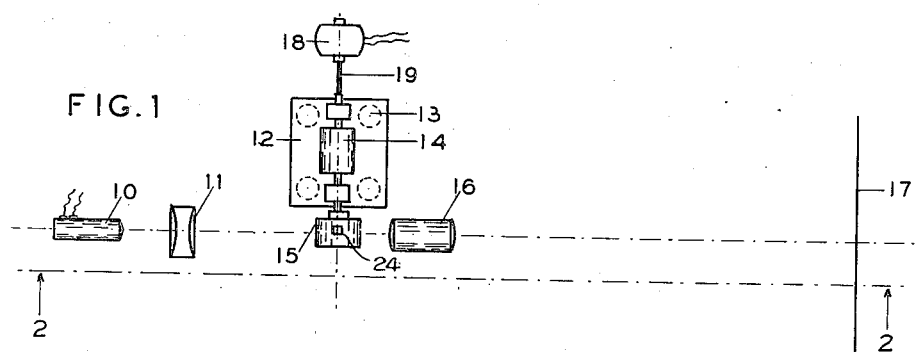
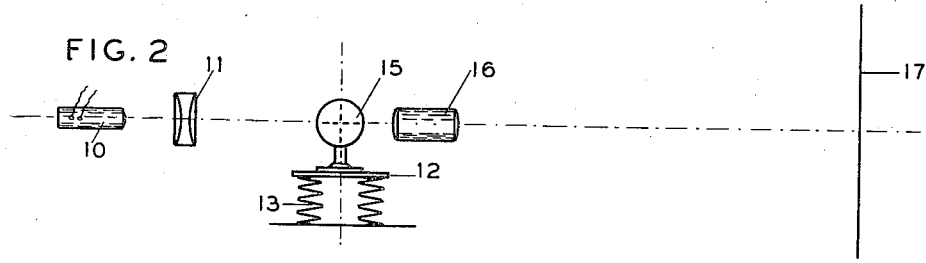
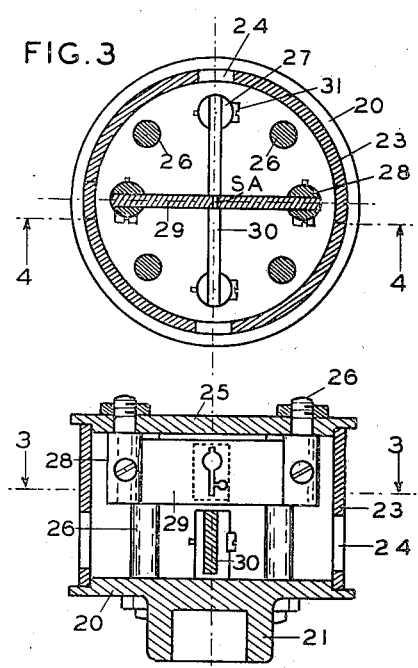
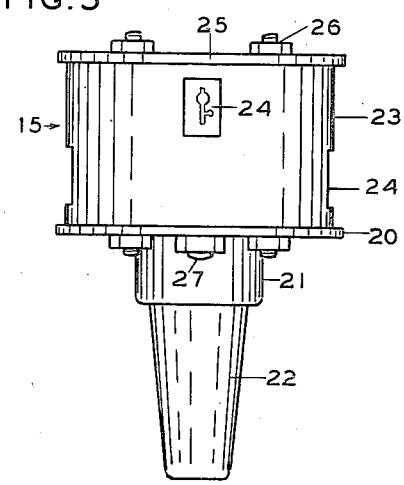
G.H. MEINZER
INVENTOR
ATTORNEY May 23, 1944.  G. H. MEINZER  2,349,450
APPARATUS FOR DYNAMIC BALANCING
Filed Aug. 2, 1941  3 Sheets-Sheet 2

— INDICATOR TA
— CENTER OF GRAVITY
— INDICATOR TB
— PLANE B
— PLANE A
— ECCENTRIC WEIGHT F

G. H. MEINZER
INVENTOR

Paul W. Bridgman
ATTORNEY

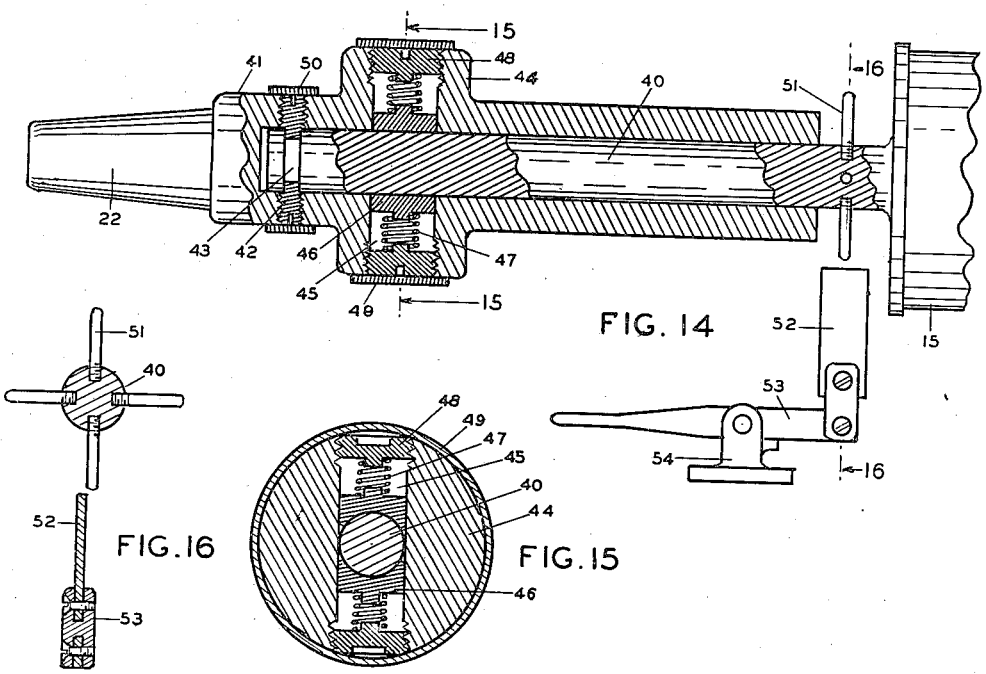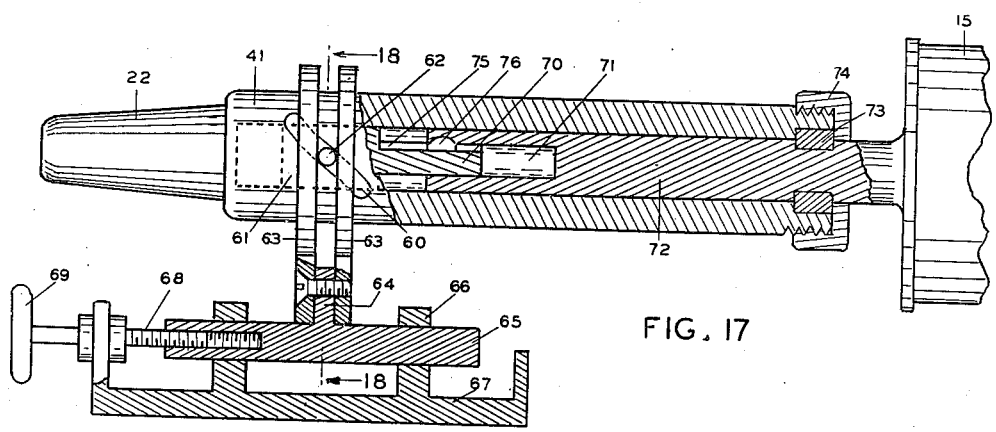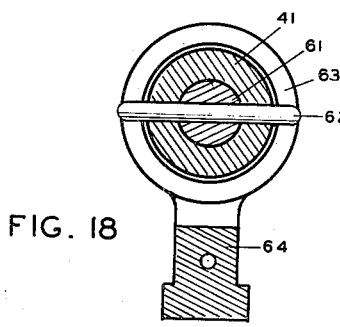

Patented May 23, 1944

2,349,450

UNITED STATES PATENT OFFICE 2,349,450

APPARATUS FOR DYNAMIC BALANCING

Gotthold Harry Meinzer, Glendale, Calif.

Application August 2, 1941, Serial No. 405,174

16 Claims. (Cl. 73—53)

The broad purpose of the invention is to provide an improved and simplified apparatus for measuring, vectorially, the periodic radial displacements of a rotating axis, due to the eccentric forces acting thereon.

More specific objects of the invention are to provide a means for correcting the dynamic eccentricity of an unbalanced rotor by an improved system for determining the mass and angular location of the corrective compensation.

The methods now in use for the dynamic balancing of rotating parts are open to improvement in several respects. Such methods as use simple apparatus are highly inaccurate and are time-consuming in that they involve trial and error. The more rapid and accurate methods require highly complicated balancing heads or intricate electrical circuits. Such apparatus is expensive, requires expert supervision, and is limited in range of application of any one assembly.

The operation of determining the dynamic unbalance of a rotor, by any method, involves: supporting the rotating test-piece on a spring-suspended table to permit undamped vibration about the two balancing planes; measuring directly or indirectly the amplitude of vibration of the rotating piece, and determining the angular direction or radius along which the eccentric force is acting.

Since the amplitude of vibration is proportional to the magnitude of the eccentric force, the calibration of any particular balancing system through the addition of known or unit eccentric forces permits the measured amplitude due to an unknown eccentric force to be converted into units of calibration for the purpose of compensation.

Utilizing these well-known general principles, the invention herein described provides means for simultaneously determining:

(a) The displacement or amplitude of vibration of an unbalanced rotor;

(b) The angular position of the diameter along which the resultant eccentric force is acting, and (c) The side of the shaft center (e. g., right or left) on which the eccentric force is located. It also provides a means for (d) Resolving an eccentric force into its two components along any predetermined coordinate diameters; and (e) Directly determining the phase angle between the location of the unbalance in a rotor and the "high-spot" of vibration, thus adapting the method to the balancing of equipment under operating conditions (damped systems).

The apparatus is basically a vibration analyzer, instantaneously projecting the lateral displacements of a vibrating axis, at predetermined phases of revolution, in a plane parallel to the rotating axis. Since the eccentric force in any unbalanced vibrating system acts along a definite radius, or diametric plane, the vibration vector must bear a definite mathematical relation to every other diametric plane through the axis. Hence the projected displacement, or amplitude, of the axis for every revolution of the shaft, bears a definite mathematical relation to the projected displacement, or maximum amplitude, of the axis in a diametric plane containing the eccentric force (the zero plane). Thus by measuring the projected displacements or amplitudes of the axis along any two coordinate diametric planes, we can determine the phase angle between the unknown eccentric force radius or diametric plane and the coordinate measuring or reference planes, thus "locating" the unbalanced force. Further, having determined the angular relation of the eccentric force to the reference planes, we can compute the maximum, or full, amplitude of vibration in the diametric plane containing the unbalance force, from the measured amplitudes in the reference planes.

We thus at once determine the location and obtain a measure of the magnitude of the unknown eccentric force by projecting the displacements of the vibrating axis along any two coordinate diametric reference planes parallel to the axis.

DESCRIPTION OF APPARATUS

In the description of the apparatus and of its utilization, reference will be made to the drawings herewith, containing the following figures:

Fig. 1 is a plan view of a generalized illustrative assembly of a complete apparatus;

Fig. 2 is a front elevation of the same, as on the line 2—2 of Fig. 1;

Figure 6:
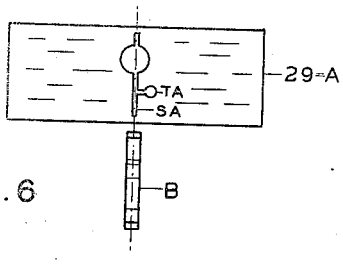
Figure 7:
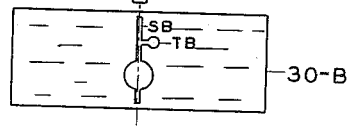
Figure 12:
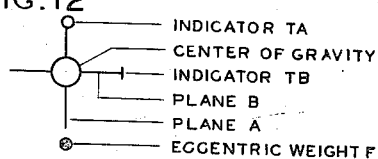
Figure 13:
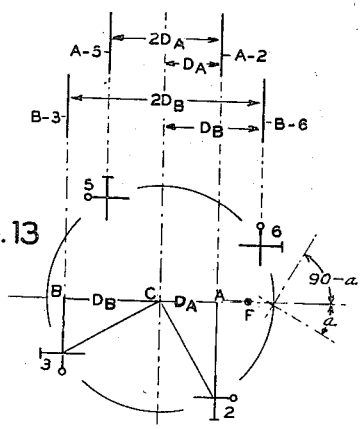

Fig. 3 is a plan section of the slit plane head 15 of Figs. 1 and 2, as on the line 3—3 of Fig. 4;

Fig. 4 is a vertical section of the same, as on the line 4—4 of Fig. 3;

Fig. 5 is an elevation of the same;

Fig. 6 is a diagram showing slit plane B in cross section and slit plane A in face elevation;

Fig. 7 is a diagram showing the planes of Fig. 6 rotated 90°;

Figs. 8, 9, 10, and 11 are diagrams illustrating the interpretation of images observed on the viewing screen 17 of Fig. 1;

Fig. 12 illustrates the symbols used in Figs. 8 to 11 inclusive and 13;

Fig. 13 is a diagram illustrating certain mathematical relations between deflections, angular location of unbalance, and magnitude of unbalance;

Fig. 14 is a longitudinal section and partial elevation of a modification of the device including means for producing relative rotation between the head and the shaft on which the work to be balanced is supported, while the shaft is itself in rapid rotation;

Fig. 15 is a cross section through the adjustable friction member of the above modification, as on the line 15—15 of Fig. 14;

Fig. 16 is an elevation of the braking element of the same, as on the line 16—16 of Fig. 14;

Fig. 17 is a longitudinal section and partial elevation of another modification producing the same relative rotation, and Fig. 18 is a cross section of the above as on the line 18—18 of Fig. 17.

Figure 10:
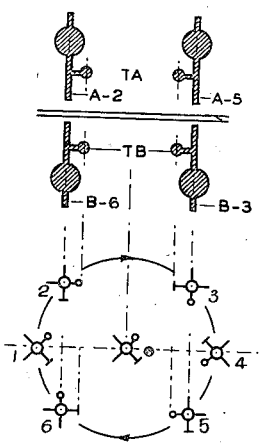
Figure 11:
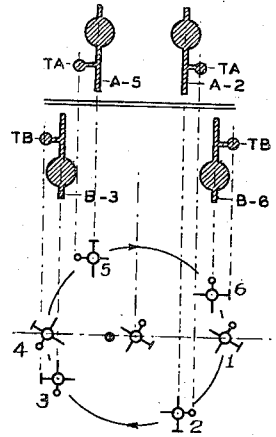

Referring first to Figs. 1 and 2, 10 is a light source, 11 a condensing lens, 12 a table mounted on four coil springs 13, 14 is any rotor being balanced, 15 is a slit plane head shown in detail in Figs. 3 to 8 inclusive, 16 is a projecting lens and 17 a viewing screen on which the measurements of displacement are made. All of these elements except the head 15 are individually well known and the proportions and spacing of the elements will be evident from considerations later stated. The manner of driving the rotor is a matter of wide choice. A constant speed electric motor mounted on the table for rotation in a horizontal plane or beneath it for vertical rotation is suitable. The only parts of this assembly requiring variation to fit the duty imposed are the table and the mounting springs, which must be so proportioned as to carry the load and vibrate freely about the center of gravity of the system.

Referring now to Figs. 3 to 5 inclusive, an illustrative structure for the head 15 may consist of a base plate 20 provided with a hub 21 bored to fit closely over the end of a shaft on which the piece to be tested is mounted for rotation. If more convenient, a taper shank 22 may be adapted to fit a corresponding socket formed in the end of the shaft, as indicated in Fig. 5. The base plate may be shouldered to receive an opaque shield ring 23 which should be provided with windows or relatively wide slots indicated at 24. A cap 25 bears on the upper end of the ring and is retained and aligned as by studs and nuts 26.

Passing through the base plate and cap plate respectively are pairs of studs 27—27 and 28—28 to which the metallic slit plates 29 and 30 are fastened by means of screws 31. These slit plates will be referred to hereinafter as slit planes A and B respectively. The construction shown for the head is a preference only and, within the limits fixed by the following description of the form and arrangement of the slit planes, is subject to wide variation.

The basic element of the measuring apparatus of this invention consists of a pair of superimposed diametric plane surfaces A and B (the slit plates 29 and 30), mounted at right angles to each other on the shaft carrying the rotor to be tested, in such position that the prolonged intersection of the two surfaces lies in the axis of the rotating shaft. Each of the diametric planes is perforated by an axial slit or aperture, SA and SB (Figs. 6 and 7), at right angles to the plane of the surface, the long dimension of each slit being accurately aligned to lie in the axis of the rotating shaft.

If now a beam of collimated light be projected, in a direction normal to the rotating axis, upon the slit planes, and the shaft with the affixed slit planes be caused to rotate, each slit will function as an optical shutter, allowing light to pass through the slit only for the brief instant during which the slit plane is at right angles to the direction of the light beam. The duration of the light flash will obviously depend on the relation between depth and width of the slit and the rotative speed of the shaft.

By means of the projecting lens 16 the image of the illuminated slit is magnified and focussed on the screen 17 for observation and measurement, or on a sensitized surface for photography. It is obvious from the figures that for each revolution of the shaft each plane is twice in position to allow light to pass through the slit and produce an image on the screen. It is also evident that in a balanced system, in which there is no displacement of the axis, the images of the slits in the two coordinate planes will appear on the screen in alignment with each other and with the axis of the rotating shaft, and the two images produced by the revolution of each single plane will be superimposed to produce an apparent single image lying in the center line of the shaft.

With the rotor out of balance a variety of image patterns may be produced, as illustrated in the diagrams of Figs. 8 to 11 inclusive. These figures show the image patterns obtained from an unbalanced rotating system for different angular relations of the reference slit planes with respect to the diametric plane in which the eccentric force is acting.

In these four figures the black dot F indicates the position of the eccentric force in each case with respect to the coordinate slit planes, which are identified by the symbol

for the A plane and the symbol

for the B plane, the position of the symbol indicating the phase of rotation of the shaft.

Figure 8:
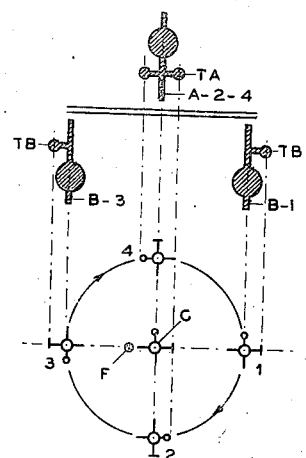
Figure 9:
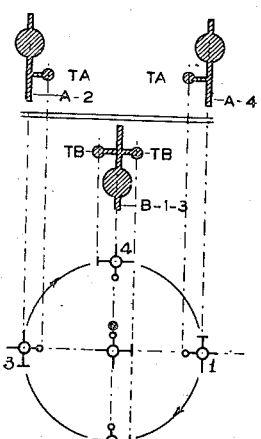

The central position at C corresponds to the "at rest" position of the shaft axis and the center of gravity about which the system vibrates in the circular path indicated by the lower circle (e. g., 1—2—3—4—1 for Fig. 8). The eccentric force F is assumed to be the same for all four cases, hence the amplitude of vibration is represented by circles of equal diameter in the four figures.

We start with the assumption that the system is elastically supported (as on the table 12 of Figs. 1 and 2) in such manner that it can vibrate about its center of gravity C. We also assume the system to be rotated above its critical speed, so that the "heavy side" or radius containing the eccentric mass, will always be directed toward the center C. The direction of rotation of the shaft, and the consequent vibratory rotation, are assumed to be clockwise, and the direction of illumination to be as indicated by the broken lines.

CASE 1.—*Slit plane B in the same diametric plane as eccentric force F. Represented by Fig. 8*

From the static position C, upon rotation, the system will be displaced to the right, to position 1, and will rotate about C in a clockwise direction to a maximum diameter equal to 3—1. At position 1 slit plane B, being in a position perpendicular to the direction of illumination, will pass the slit image B—1. At position 2, advanced 90° in rotation and vibration, slit A will pass the image A—2. At position 3, slit B will again pass an image B—3, and at position 4, slit A again passes an image A—4, superimposed on image A—2.

It will be evident that, when one of the slit planes is coincident with the diametric plane of the eccentric force, the deflection (spacing on the screen) of the images from that slit plane is a direct measure of the amplitude of vibration of the system. It is hence a direct measure of the magnitude of the eccentric force, in units the value of which is as yet unknown (see section "Calibration"). The relation of coincidence (zero angle) for an unknown condition is immediately recognized by the appearance on the viewing screen of an apparent single image (no apparent deflection) for one of the slit planes.

CASE 2.—*Slit plane A coincident with plane of eccentric force. Represented by Fig. 9*

The image record for this relation is the same as in Case 1, with the exception that the full amplitude now appears in the screen field for plane A, images A—2 and A—4, the single image for plane B appearing at B—1—3.

CASE 3.—*Slit planes A and B at angles of 45° from eccentric force plane. Represented by Fig. 10*

From the diagram we see that slit plane A forms images A—2 and A—5 at positions 2 and 5, while plane B forms images B—3 and B—6 at positions 3 and 6, the open positions of the slits occurring at locations 45° from the horizontal or maximum deflection diameter. The deflections or displacements of the A and B images are equal.

CASE 4.—*Reference plane A at angle of 60° and reference plane B at angle of 30° from eccentric force diameter. Represented in Fig. 11*

The open positions of slit A are seen to be at 2 and 5 to form images A—2 and A—5, while slit B forms images B—3 and B—6 at positions 3 and 6. These positions of image formation for plane A are at 60° from the horizontal diameter and for plane B at 30°.

In the above descriptions the image patterns have been shown for various angular relations of the reference planes to the eccentric force diameter. We have still to determine along which radius (right or left of the center) the eccentric force is acting, it being obvious that the image patterns will be identical for equal eccentric forces 180° apart. For this purpose the slit planes are provided with perforations indicated at TA and TB in Figs. 6 and 7, the images of these perforations being indicated by the same characters in diagrams Figs. 8 to 11 inclusive. These perforations, referred to elsewhere as indicators, are arranged unsymmetrically with respect to the axial slits, as shown in Figs. 6 and 7.

The position of the images of these indicators as regards the images of the slit shows us immediately whether the eccentric mass is on the same side of the rotor center as the indicator or on the opposite side. Since, at rotative speeds above the critical, the "heavy side" moves inwardly, the location of the indicator images inward of (i. e., between) the slit images shows that the heavy side is on the same side of the axis as the indicator, and vice versa.

For rotative speeds below the critical these indications are reversed, and in the first use of any wholly unknown set-up it may be necessary first to ascertain whether the rotative speed selected is above or below the critical speed of rotation of the system.

MATHEMATICAL RELATIONS

*Between image deflections in reference planes A and B, angular location, and magnitude of eccentric force. Illustrated in Fig. 13*

Let eccentric force radius F make any unknown angle $a$ with slit plane B, then its angular relation to plane A will be $(90-a)$ since planes A and B are fixed at a 90° angle. Construct the triangle C—A—2 at position 2, where plane A forms image A—2. Now C—A is equal to $D_A$, one-half the total deflection in the A plane; C—2=R, or one-half the maximum amplitude of vibration caused by eccentric force F. Angle C—2—A is equal to angle $a$. At position 3, where plane B forms image B—3, construct the triangle B—C—3, in which B—C=$D_B$, one-half the total deflection in the B plane. C—3=R as above, and angle B—3—C=$(90°-a)$.

Now in triangle C—A—2, $$\sin a = \frac{D_A}{R}$$

and in triangle B—C—3, $$\sin(90°-a) = \frac{D_B}{R}$$

But, $\sin(90°-a) = \cos a$.
Hence, $$\cos a = \frac{D_B}{R}$$

Now, $$\frac{\sin a}{\cos a} = \tan a = \frac{D_A/R}{D_B/R} = \frac{D_A}{D_B}$$

And since $D_A$ and $D_B$ are half deflections, we can write $$\frac{2D_A}{2D_B} = \frac{A \text{ deflection}}{B \text{ deflection}} = \tan a$$

Hence, having measured the deflections of the slit images produced by the slit planes A and B, the ratio of these deflections gives us the value of the tangent of the unknown angle $a$ and thus the angular position of the slit planes with respect to the eccentric force radius. The angular position of these planes with respect to the rotor being known, we thus determine the angular position of the eccentric force radius with respect to the rotor.

For example (as illustrated in Fig. 13)

$$2 D_A = 16.0 \text{ mm.}$$
$$2 D_B = 28.5 \text{ mm.}$$

Hence $\tan a = 16/28.5 = 0.56$
From a table of natural trigonometric functions we find that $\tan = 0.56 = 29\frac{1}{2}°$, hence the slit plane B is at an angle of $29\frac{1}{2}°$ to the radius along which the eccentric force is acting. Similarly, slit plane A is at an angle of $(90-a) = (90-29\frac{1}{2}) = 60\frac{1}{2}°$ to the unbalance force radius.

Having determined the angle $a$, we can calculate the amplitude $2R$ from the foregoing relations, thus:

$$\sin a = \frac{D_A}{R}, \; 2R = \frac{2D_A}{\sin a}$$

or $$\cos a = \frac{D_B}{R}, \; 2R = \frac{2D_B}{\cos a}$$

In the above illustration, $2 D_A = 16$ mm., and from tables, $\sin 29\frac{1}{2}° = 0.49$. Then $$2R = \frac{16}{0.49} = 32.5 \text{ mm.}$$

Knowing now the amplitude, which is directly proportional to the magnitude of the eccentric force, we can convert it by calibration of any specific set-up to any desired practical unit.

To summarize the above stated mathematical relations:

(1) Angular location of eccentric force with respect to reference planes A and B is found from Ratio of deflection A to deflection B = tangent of the unknown angle (2) Magnitude of eccentric force, equals Calibration factor × amplitude, and $$\text{Amplitude} = \frac{\text{deflection A}}{\sin a}, \text{ or } \frac{\text{deflection B}}{\cos a}$$

Technique of Operation

Calibration

The first step in the balancing operation is calibration of the observed and measured deflections, for any specific piece of apparatus, speed of rotation and weight of test piece, in terms of any convenient compensating unit, for example inch-ounces. Calibration by this method is very simple, no "ideal" or balanced rotor being required.

Starting with an unbalanced rotor, the deflections in the two coordinate planes are measured. Selecting a balancing plane (a plane normal to the axis of rotation in which it is convenient to add compensating weight), a known additional eccentric mass is added at the intersection of the balancing plane with the projection of one of the slit planes. The deflections are then again measured and the difference between the two readings gives directly the value of deflection distances in terms of eccentric force units.

Phase angle

In balancing rotors under conditions of damped vibration, for example the rotors of machines under operating conditions, the "high spot" due to unbalance may not be in phase with the eccentric force radius. This condition will be known to exist if the addition of an eccentric mass in a diameter coincident with one of the slit planes changes the deflection in both planes. The phase angle may then be directly calculated from the ratio of change in readings for the two planes, as above described: i. e., tangent of phase angle = ratio between the two changes due to the added eccentric weight.

Compensation along predetermined diameters

Instead of actually locating the unbalance radius and calculating the single compensating weight to be applied on such radius, it is possible by the method herein described to compensate along any predetermined coordinate diameters or radii. In this procedure the slit planes are aligned, on the shaft, with the selected diameters, the deflections then indicating directly the amount of compensation required on each.

In balancing multithrow crankshafts or multiblade propellers a slit plane or pair of coordinate planes may be aligned with each throw or blade, thus simplifying the compensating operation to the ultimate degree.

While the calculations above described are of the simplest character, it is obviously desirable in rapid production work to eliminate calculation entirely by bringing one of the slit planes into correspondence with the diameter of unbalance. If the head carrying the slit planes be rotated as regards the work to be balanced until an apparent single image is produced by one of the slit planes, as illustrated at A in Fig. 8, the other slit plane (B) will then coincide with the diameter in which the unbalanced weight occurs, and the circumferential position at which the compensating weight is to be placed may be read directly by projecting this plane (B) onto the work.

It is obviously impracticable to feel for this position by repeatedly stopping the rotation of the shaft and readjusting the position of the head as regards the shaft, and I have therefore provided means for revolving the head with relation to the shaft while the head is in rotation at full speed.

In the form shown in Figs. 14 to 16 inclusive the head 15 is mounted on a relatively long shaft 40 which is axially aligned within a socket 41 which may have the taper end 22 of Fig. 5 or the socket 21 of Fig. 4. The shaft should be a close running fit in the base of the socket and may be retained against endwise movement by one or more screw pins 42 projecting through the wall of the socket into a circumferential groove 43 formed in the shaft.

At a medial position in the length of the socket is formed a wide and relatively shallow collar 44 in which, at diametrically opposed points, two or more threaded bores 45 are formed. In the bottom of each of these bores is placed a minute brake block 46, formed on its lower face to exactly fit the curvature of the shaft. These brake blocks are urged against the shaft by open coil springs 47, the tensions of which are adjusted by the flat screw caps 48. It is desirable to surround this collar with a spring slip ring 49 and a similar ring 50 may desirably be passed over the heads of screws 42, in both cases to prevent the accumulation of dirt and to avoid air turbulence.

The shaft carrying the head is now rotatable as regards the socket, which in turn is nonrotatably fixed in or on the end of the shaft carrying the work to be balanced, but the tension on the brake block springs is so adjusted that the shaft 40 does not rotate freely but requires the application of an appreciable force to produce relative rotation.

On the end of the shaft projecting from the socket is placed a braking device tending to retard the rotation of the shaft and thus to cause it to rotate with respect to the socket. Any desired form of brake may be used.

I have therefore devised the novel form of brake illustrated in Figs. 14 and 16. This consists of a desired number (for example, four or six) of equally spaced rods or stiff wires 51 projected radially from the shaft, and a flexible member 52 arranged to be raised and lowered so as to engage the ends of the wires as they pass. This flexible member may be a thin flat spring lightly loaded at its upper end, or preferably a small piece of sheet rubber packing. The flexible member is carried, for example, at the end of a bent arm 53 pivoted on a standard 54 which in turn is supported on any stationary object adjacent the head.

On depressing the free end of this arm the upper end of the flexible member is brought into contact with the ends of rods 51 as they pass, striking an extremely rapid succession of very light taps by which the rotation of the head is retarded and it is caused to revolve with respect to the socket in which it is supported. By holding the flexible member in the contacting position the two pairs of images A and B may be caused progressively to approach and recede, and by dropping the flexible member the relative rotation may be stopped at the exact point at which one of the slit planes produces an apparent single image. At this point, as said, the unbalanced weight is in the diameter corresponding with the other slit plane, and the amount of unbalance may be read directly by scaling the distance between the separated images as heretofore described.

In the alternative method of construction shown in Figs. 17 and 18, the socket 41 is provided with a pair of oppositely disposed helical slots 60 and a short section 61 of shaft slidable in the base of the slot has a hard steel pin 62 extending through the slot and extending for some distance beyond the outer diameter of the socket. The ends of these pins are engaged on opposite sides by two hard steel discs 63 which are supported in exact parallelism and in a position normal to the axis of rotation on a standard 64 so supported as to be capable of longitudinal movement. A suitable supporting means may be a square bar 65 sliding in two bearings 66 which in turn are attached to a base plate 67 attached to any conveniently located stationary object. The bar may be drilled longitudinally, internally threaded, and provided with a long screw 68 having a thumbnut 69 by means of which the screw may be revolved to move standard 64 and discs 63 longitudinally of the socket. This longitudinal movement causes endwise movement of pins 62 in helical slots 60 and thus rotates the short shaft section within and with respect to the socket.

I therefore prefer to reduce the diameter of the outer end of shaft section 61, as at 70, and provide a corresponding bore 71 within a second shaft section 72 on which head 15 is mounted. This section is restrained against endwise movement by a split collar 73 retained by cap 74. The bore 71 and the reduced section 70 being provided with mating spline and feather 75 and 76, the endwise movement and rotation of shaft section 61 cause an equal rotation of the head without moving that element longitudinally.

In the use of either of the forms shown in Figs. 14 and 17, any calculation for locating the diameter in which the unbalance force occurs or the magnitude of that force (other than the application of a calibration factor) is avoided. In using these forms or their mechanical equivalents the piece to be balanced is brought up to speed and the head containing the slit planes is then rotated with respect to the body until the images of one pair coalesce to form a single sharply defined image and the images of the other pair have separated to the maximum distance. These positions necessarily occur at the same phase in rotation of the head as regards the work. This maximum distance having been measured, the work is brought to rest and the amount of unbalanced weight, determined by applying the calibration factor for the system to the above measurement, is applied to the work in the diameter coinciding with the plane in which the measurement is taken and on the side of the work ascertained from the position of the indicating spot TA or TB as above described.

In the use of either of these forms in which it is possible to rotate the head with regard to the work while in revolution at testing speed, it is possible also to make all of the determinations with the use of a single plane A or B instead of the pair of planes heretofore described. In this procedure the work is brought up to testing speed and the head then gradually rotated with respect to the work until the images of the slit have separated to the maximum distance, the position of the plane then indicating the diameter in which the unbalance occurs and the distance the magnitude of the unbalance. Or if preferred the head may first be rotated until the two images coalesce to a single image and the head then again rotated through exactly 90°, which will bring the two images to the position of greatest divergence with perhaps slightly more accuracy than by determining the maximum distance by measurement. In this practice the work may be stopped and the second rotation of the head produced by hand, or by the provision of a suitable mechanical contrivance the 90° rotation may be produced without stopping the work.

While these methods using a single slit plane are not as convenient as the method using a pair of planes arranged in coordinate diameters, they are fully operative and as accurate as the method using two planes.

The sharpness of the images of the slit and indicators as projected on the screen will vary with the distance through which the images travel in the time during which the apertures are open to the passage of light. For this reason the windows 24 should be as narrow as possible and may even be given the shape and dimensions of the apertures through the planes if exactly aligned therewith.

The method and apparatus herein described are believed to be advantageous over methods and apparatus heretofore disclosed, in the following particulars:

In extreme simplicity of construction and ease and rapidity of operation;

In operability by relatively unskilled persons;

In complete elimination of trial and error;

In high sensitivity produced by simple optical projection and magnification;

In yielding direct vectorial measurement of the eccentric force;

In the ease of resolving the eccentric force into its components along any predetermined coordinate diameters;

In the ability to make readings at any desired rotative speed, without limitation to or preference for the critical speed;

In the ability to make readings at the particular rotative speed at which the test piece is to be operated;

In the ability to adapt a single instrument to a wide range of conditions by simple recalibration, and In the adaptability to the balancing of rotating parts in place and under operating conditions.

I claim as my invention:

1. Apparatus for measuring the dynamic unbalance of a rotating element, comprising: a resilient supporting means; a body member including an opaque circumferential shell mounted on and arranged to be rotated in axial alignment with said element; two opaque plane surfaces mounted substantially edge to edge in said body at an angle of 90°, each of said planes having a relatively minute opening arranged in the axis of rotation of said body and said shell having oppositely disposed windows arranged in lines normal to said planes; means for projecting a collimated light beam through said windows, against said planes and through said openings as said planes come into positions approximately normal to said beam, and a screen arranged to receive and visualize the images of said openings produced by the projection of said light beam therethrough.

2. Apparatus for measuring the dynamic unbalance of a rotating element, comprising: a resilient supporting means; a body member including an opaque circumferential shell mounted on and arranged to be rotated in axial alignment with said element; two opaque plane surfaces mounted substantially edge to edge in said body at an angle of 90°, each of said planes having a relatively narrow slit arranged in the axis of rotation of said body and said shell having oppositely disposed windows arranged in lines normal to said planes; means for projecting a collimated light beam through said windows, against said planes and through said slits as said planes come into positions approximately normal to said beam, and a screen arranged to receive and visualize the images of said slits produced by the projection of said light beam therethrough.

3. Apparatus for measuring the dynamic unbalance of a rotating element, comprising: a resilient supporting means; a body member including an opaque circumferential shell mounted on and arranged to be rotated in axial alignment with said element; two opaque plane surfaces mounted substantially edge to edge in said body at an angle of 90°, each of said planes having a relatively minute opening arranged in the axis of rotation of said body and a secondary minute opening spaced from said axis and said shell having oppositely disposed windows arranged in lines normal to said planes; means for projecting a collimated light beam through said windows, against said planes and through said openings as said planes come into positions approximately normal to said beam, and a screen arranged to receive and visualize the images of said openings produced by the projection of said light beam therethrough.

4. Means for projecting on a screen the extended position of the axis of a rotating and vibrating element at predetermined phases of rotation of said element, comprising: a pair of opaque plane elements angularly arranged edge to edge in planes including the axis of said rotating element, said plane elements being so attached to said rotating element as to vibrate and to rotate therewith, each said plane being provided with an axially arranged aperture; a screen, and means for directing a light beam through said apertures onto said screen.

5. Apparatus substantially as and for the purpose set forth in claim 4, including a supplementary aperture in each said plane unsymmetrically disposed with reference to said axially arranged aperture.

6. Apparatus substantially as and for the purpose set forth in claim 1, in which said body member is axially rotatable with respect to said rotating element, and including means for rotating said body member with respect to said rotating element while said rotating element is in rapid revolution.

7. Apparatus substantially as and for the purpose set forth in claim 1, in which said body member is axially rotatable with respect to said rotating element, and including friction-producing means tending to restrain said body rotation, and manually controllable means for retarding the free revolution of said body member and thereby changing the angular position of said body member with respect to said rotating element while both are in rapid revolution.

8. Apparatus substantially as and for the purpose set forth in claim 1, in which said body member is axially rotatable with respect to said rotating element but tending normally to revolve therewith, and including rigid projections from said body member and a flexible element arranged to be brought at will into contact with said projections to retard the normal revolution of said body member and cause a change in the angular position of said body member with respect to said rotating element while both are in rapid revolution.

9. Apparatus substantially as and for the purpose set forth in claim 1, in which said body member is axially rotatable with respect to said rotating element and is connected thereto by a sleeve having a shaft axially movable therein, said sleeve having a substantially helical slot formed therein, a pin projected laterally from said shaft through said slot, and manually actuated means for moving said pin longitudinally in said slot and thereby changing the angular position of said body member with respect to said rotating element while both are in rapid revolution.

10. Apparatus substantially as and for the purpose set forth in claim 1, in which said body member is axially rotatable with respect to said rotating element, and including means for bringing one of said planes into coincidence with the diametric plane containing the unbalanced weight while said rotating element is in rapid revolution.

11. Apparatus for measuring the dynamic unbalance of a rotating element, comprising: a resilient supporting means; a projection from said rotating element arranged to be rotated by and in axial alignment with said element; a body member revolvably mounted on said projection and tending normally to rotate in axial alignment therewith, said body member including an opaque plane surface having a relatively minute opening arranged in the axis of rotation of said body and a relatively minute opening spaced from said axis, said body member including a circumferential shell housing said plane and having oppositely disposed windows arranged in the line passing through said axially disposed opening and normal to said plane; means for projecting a collimated light beam through said windows and said openings as said plane comes into positions approximately normal to said beam; a screen arranged to receive and visualize the images of said openings produced by the projection of said light beam therethrough, and means for revolving said body member with respect to said projection while said rotating element is in rapid revolution.

12. Apparatus for measuring the dynamic unbalance of a rotating element, comprising: a resilient supporting means; a body member revolvably mounted on said element and tending normally to rotate in axial alignment and in synchronism therewith, said body member including an opaque plane surface having a relatively minute opening arranged in the axis of rotation of said body and a relatively minute opening spaced from said axis, said body member including a circumferential shell housing said plane and having oppositely disposed windows arranged in the line passing through said axially disposed opening and normal to said plane; means for projecting a collimated light beam through said windows and said openings as said plane comes into positions normal to said beam; a screen arranged to receive and visualize the images of said openings produced by the projection of said light beam therethrough, and means for revolving said body member with respect to said rotating element while said element is in rapid revolution.

13. Apparatus for measuring the dynamic unbalance of a resiliently supported rotating element, comprising: two substantially opaque plane surfaces mounted at an end of said element to rotate therewith, said planes being arranged substantially edge to edge in the axis of rotation of said element and at an angle of 90°, each of said planes having a relatively minute opening arranged in said axis; means for projecting a collimated light beam against said planes and through said openings as said planes come into positions approximately normal to said beam, and a screen arranged to receive and visualize the images of said openings produced by the projection of said light beam therethrough.

14. Apparatus for measuring the dynamic unbalance of a resiliently supported rotating element, comprising: two substantially opaque plane surfaces mounted at an end of said element to rotate therewith, said planes being arranged substantially edge to edge in the axis of rotation of said element and at an angle of 90°, each of said planes having a relatively minute opening arranged in said axis; means for projecting a collimated light beam against said planes and through said openings as said planes come into positions approximately normal to said beam; means for intercepting light tending to pass said planes when in other than said normal position, and a screen arranged to receive and visualize the images of said openings produced by the projection of said light beam therethrough.

15. Apparatus for measuring the dynamic unbalance of a resiliently supported rotating element, comprising: a substantially opaque plane surface mounted at an end of said element and in the axis of rotation thereof, said plane normally rotating with said element but being capable of axial rotation with respect thereto, said plane having a relatively minute opening arranged in said axis; means for changing the angular position of said plane with respect to said rotating element while both are in rapid revolution; means for projecting a collimated light beam against said plane and through said opening as said plane comes into positions approximately normal to said beam, and a screen arranged to receive and visualize the images of said opening produced by the projection of said light beam therethrough.

16. Apparatus for measuring the dynamic unbalance of a resiliently supported rotating element, comprising: a substantially opaque plane surface mounted at an end of said element and in the axis of rotation thereof, said plane normally rotating with said element but being capable of axial rotation with respect thereto, said plane having a relatively minute opening arranged in said axis; means for changing the angular position of said plane with respect to said rotating element while both are in rapid revolution; means for projecting a collimated light beam against said plane and through said opening as said plane comes into positions approximately normal to said beam; means for intercepting light tending to pass said plane when in other than said normal position, and a screen arranged to receive and visualize the images of said opening produced by the projection of said light beam therethrough.

GOTTHOLD HARRY MEINZER.